(12) United States Patent  
Walker et al.

(10) Patent No.: US 9,068,818 B2
(45) Date of Patent: Jun. 30, 2015

(54) DRIVE MECHANISMS FOR VARIABLE DIAMETER ROTOR SYSTEMS

(75) Inventors: Todd David Walker, Keller, TX (US); Bryan Kenneth Baskin, Arlington, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1225 days.

(21) Appl. No.: 12/976,140

(22) Filed: Dec. 22, 2010

(65) Prior Publication Data

US 2011/0206513 A1 Aug. 25, 2011

Related U.S. Application Data

(60) Provisional application No. 61/307,631, filed on Feb. 24, 2010.

(51) Int. Cl.
*B64C 27/46* (2006.01)
*G01B 7/30* (2006.01)
*B64C 27/32* (2006.01)

(52) U.S. Cl.
CPC . *G01B 7/30* (2013.01); *B64C 27/32* (2013.01); *B64C 27/46* (2013.01)

(58) Field of Classification Search
USPC ............... 416/87, 170 R, 169 R; 417/357
See application file for complete search history.

(56) References Cited

U.S. PATENT DOCUMENTS

| 2,712,911 | A | * | 7/1955 | Herrick .................... 244/7 A |
| 4,142,697 | A | | 3/1979 | Fradenburgh |
| 4,678,401 | A | * | 7/1987 | Bradford et al. ............. 416/32 |
| 5,299,912 | A | | 4/1994 | Fradenburgh et al. |
| 5,312,070 | A | * | 5/1994 | Arena .......................... 244/46 |
| 5,636,969 | A | | 6/1997 | Matuska et al. |
| 5,642,982 | A | | 7/1997 | Matuska et al. |
| 6,578,793 | B2 | | 6/2003 | Byrnes et al. |
| 6,655,915 | B2 | * | 12/2003 | Gmirya ........................ 416/88 |
| 2002/0109042 | A1 | * | 8/2002 | Byrnes et al. ................. 244/6 |
| 2007/0215749 | A1 | * | 9/2007 | Miner et al. .............. 244/17.11 |

* cited by examiner

*Primary Examiner* — Edward Look
*Assistant Examiner* — Maxime Adjagbe
(74) *Attorney, Agent, or Firm* — Cantor Colburn LLP

(57) ABSTRACT

A rotor hub assembly includes a rotor hub for supporting a telescoping rotor blade having an outboard section; and a drive mechanism associated with the telescoping rotor blade, the drive mechanism including: a motor; a spool driven by the motor; and a strap wound on the spool, the strap coupled to the outboard section of the telescoping rotor blade.

12 Claims, 8 Drawing Sheets

DRIVE MECHANISMS FOR VARIABLE DIAMETER ROTOR SYSTEMS

CROSS-REFERENCE TO RELATED APPLICATIONS

This application claims the benefit of U.S. provisional patent application Ser. No. 61/307,631 filed Feb. 24, 2010, the entire contents of which are incorporated herein by reference.

STATEMENT REGARDING FEDERALLY SPONSORED RESEARCH OR DEVELOPMENT

The U.S. Government may have certain rights in this invention pursuant to Contract Number NNA09DA57C with the National Aeronautics and Space Administration.

BACKGROUND OF THE INVENTION

The subject matter disclosed herein relates generally to drive mechanisms for variable diameter rotor systems, and in particular to individual driven mechanisms for retraction/extension of rotor blades.

A tilt rotor or tilt wing aircraft typically employs a pair of rotor systems which are pivotable such that the rotors may assume a vertical or horizontal orientation. In a horizontal orientation (i.e., horizontal rotor plane), the aircraft is capable of hovering flight, while in a vertical orientation (i.e., vertical rotor plane), the aircraft is propelled in the same manner as conventional propeller-driven fixed-wing aircraft.

Variable Diameter Rotor (VDR) systems are known to provide distinct advantages. That is, when the plane of the rotor is oriented horizontally, the rotor diameter is enlarged for improved hovering efficiency and, when oriented vertically, the rotor diameter is reduced for improved propulsive efficiency.

Existing VDR drive mechanisms are described in U.S. Pat. No. 5,642,982, U.S. Pat. No. 5,636,969, U.S. Pat. No. 6,578,793, U.S. Pat. No. 4,142,697, U.S. Pat. No. 6,454,532 and U.S. Pat. No. 6,655,915, U.S. Pat. No. 6,030,177 and U.S. Pat. No. 6,019,578. The entire contents of these patents are incorporated herein by reference. While these VDR drive mechanisms are well suited for their intended purposes, and some employ the use of a multi-fiber strap, a need exists to reduce the amount of torsional fatigue in the strap. Also, there needs to be a method of monitoring strap elongation, so that a strap can be replaced on condition.

SUMMARY

According to one aspect of the invention, a rotor hub assembly includes a rotor hub for supporting a telescoping rotor blade having an outboard section; and a drive mechanism associated with the telescoping rotor blade, the drive mechanism including:
a motor; a spool driven by the motor; and a strap wound on the spool, the strap coupled to the outboard section of the telescoping rotor blade.

In another aspect of the invention, a drive mechanism for extension and retraction of a telescoping rotor blade having an outboard section, the drive mechanism comprising: a motor; a spool driven by the motor; and a strap wound on the spool, the strap for connection with an outboard section of the telescoping rotor blade.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
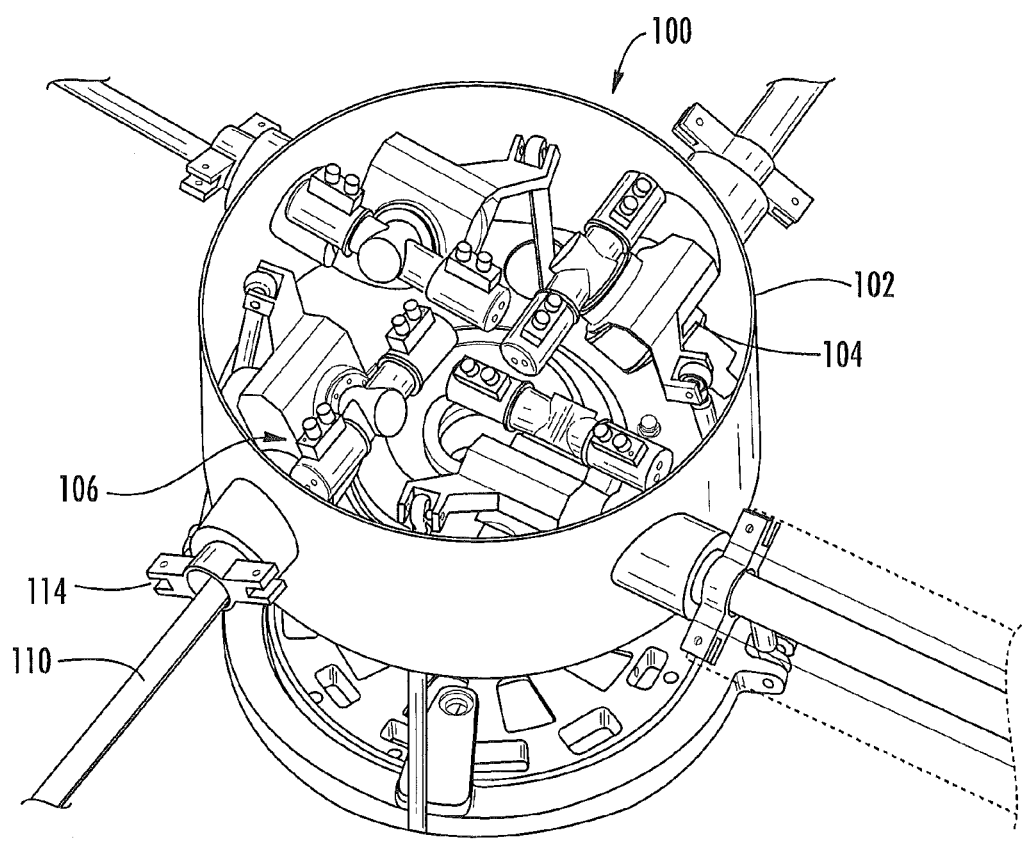
FIG. 1 is a perspective view of a gimbal rotor hub assembly having individual drive mechanisms.

FIG. 1 is a perspective view of a gimbal rotor hub assembly 100 having individual drive mechanisms for extension/retraction of rotor blades. Rotor hub assembly 100 includes a hub 102 for supporting four rotor blades, although any number of rotor blades may be employed. Hub 102 supports four blade arms 104 upon which are mounted drive mechanisms 106. Drive mechanisms 106 are hydraulically driven, but may driven via other power sources (e.g., electricity, direct drive from aircraft transmission). Each drive mechanisms 106 drives a spool 108 (FIG. 3) upon which strap 110 is wound.

Strap 110 extends from spool 108, through spindle 114 and into a rotor blade. A distal end of strap 110 is coupled to an outboard section of a variable diameter rotor blade. Strap 110 may be a multi-fiber strap, having a breaking strength and strain allowable that is well in excess of the blade centrifugal loads.

Activation of drive mechanism 106 retracts the outboard section of the rotor blade towards hub 102. When commanded, the drive mechanisms 106 rotate the spools 108 (FIG. 3) to retract the blades in a prescribed amount of time. Each motor 107 (FIG. 3) is controlled by an individual, electro-hydraulic servo valve (EHSV). In order to provide precision control, each drive mechanism 106 is servo-controlled with a feedback from a rotary resolver or RVDT (Rotary Variable Differential Transformer) in the drive mechanism. The resolver tracks revolution count of spool 108. This allows each drive mechanism 106 to be controlled separately to accommodate for differences across the drive mechanisms 106 (e.g., strap wear, strap elongation). To extend the blades, centrifugal force pulls the blades outwards, and the drive mechanism motors operate as pumps. The EHSV is used to throttle the pump power and limit extension speed. If electric motors are employed, a controller controls speed and direction of the motors rather than hydraulics.

The use of hydraulic hoses and swivels allows an individual strap 110 and spool 108 to be mounted on the blade arm and feather with the blade. This isolates each strap 110 to one blade, eliminating the high cycle torsion apparent in other designs. The use of servo-controlled hydraulic drive mechanisms 106 with rotary resolvers allows for precision control of blade position. Through the use of hydraulic hoses and swivels, the drive mechanisms 106 receive power from a central hydraulic system, which is located in either in the rotor head or on the airframe as described in further detail with reference to FIG. 7.

Figure 2:
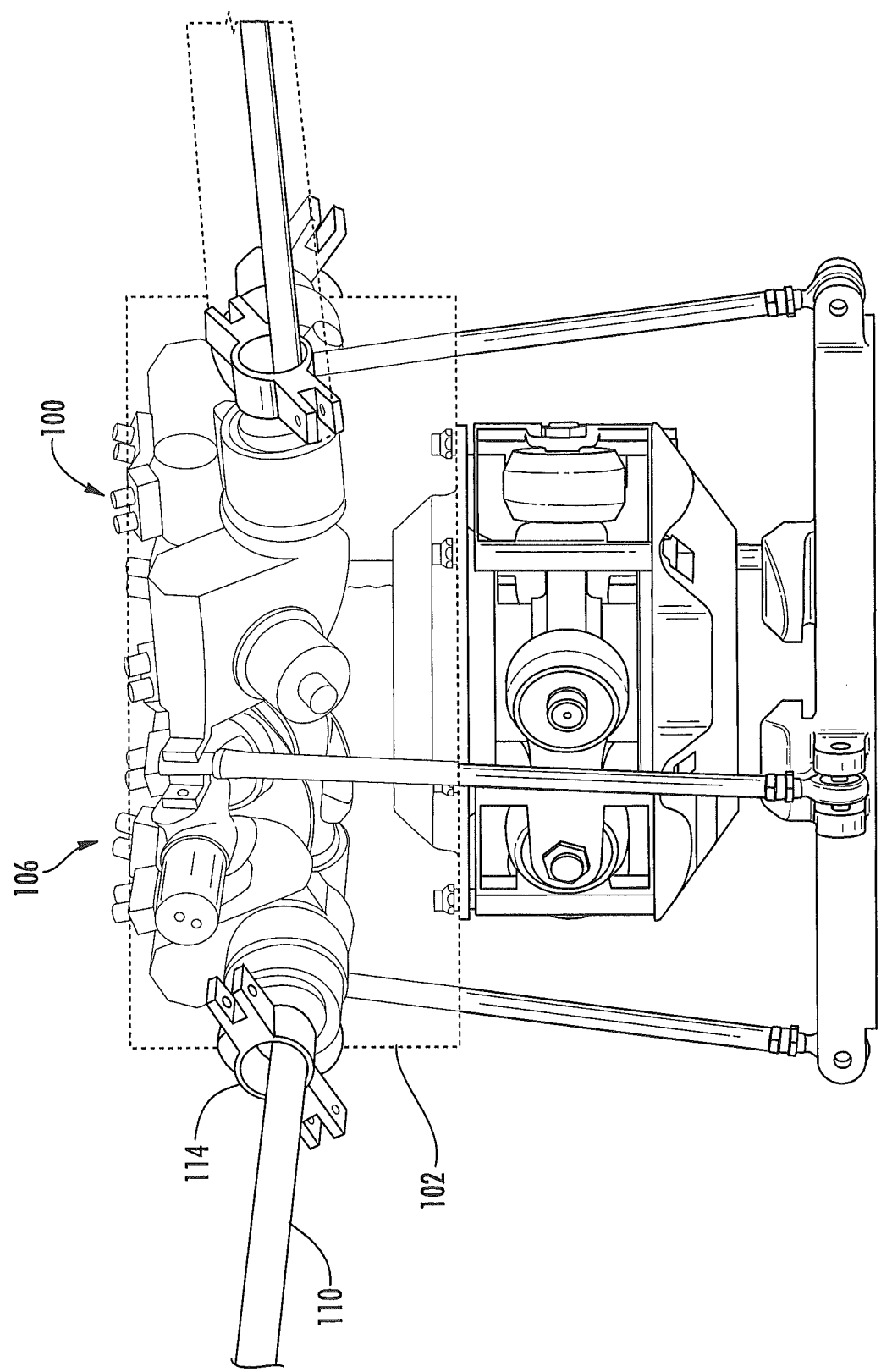
FIG. 2 is a side view of the gimbal rotor hub assembly of FIG. 1.
Figure 3:
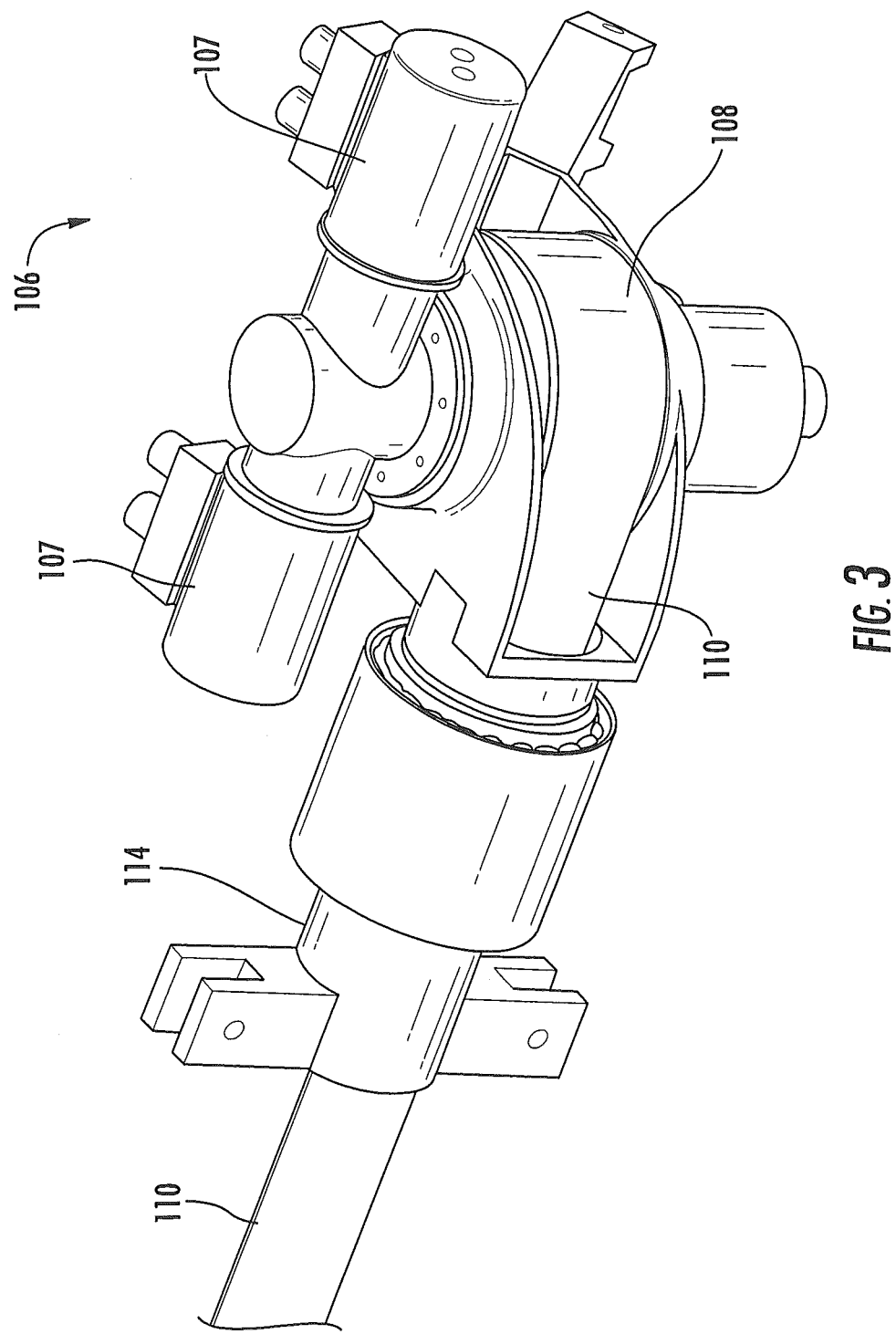
FIG. 3 is a perspective view showing a drive mechanism in the gimbal rotor hub assembly of FIG. 1.

FIG. 2 is a side view of the gimbal rotor hub assembly 100 of FIG. 1. FIG. 3 is a perspective view of a drive mechanism 106 in the gimbal rotor hub assembly of FIG. 1. Drive mechanism 106 includes two motors 107 for controlling spool 108. Evident in FIG. 3 is a blade arm spindle 114 having lubricated centrifugal force bearings.

Figure 4:
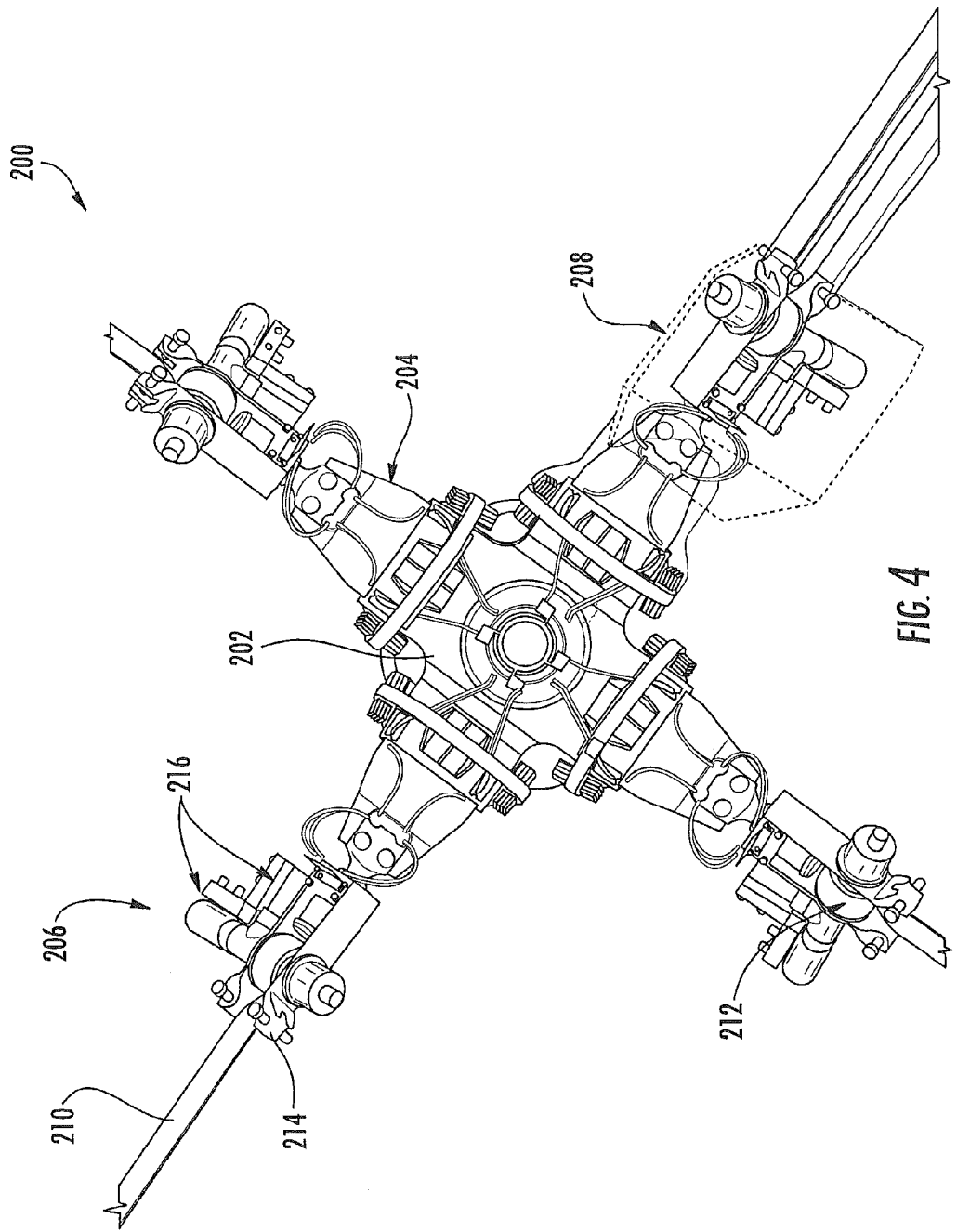
FIG. 4 is a top view of a hingeless rotor hub assembly having individual drive mechanisms in an alternate embodiment.

FIG. 4 is a top view of a hingeless, flexbeam, rotor hub assembly 200 having individual drive mechanisms 206 in an alternate embodiment. Rotor hub 202 is a low virtual hinge offset, flexbeam design with four extendable blades retracted by a strap reel system powered by a dual-hydraulic system. Rotor hub 202 includes two stacked flexbeams 204, but it is understood that any number of rotor blades may be employed. Drive mechanisms 206 are mounted on the outboard side of the spindle and are housed in fairings 208. As described in further detail herein, the drive mechanisms 206 extend/retract the rotor blades through straps 210. The drive mechanisms 206 are contained in the blade feathering system to minimize the warping strains in the strap induced by cyclic pitch and the large collective range required to convert between flight modes.

Figure 8:
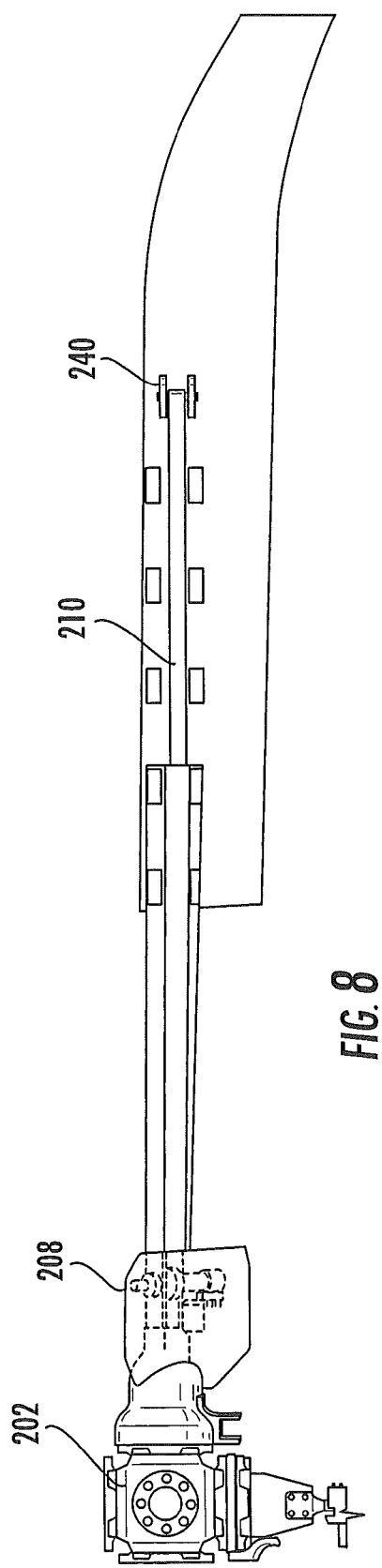
FIG. 8 is a top view showing a rotor blade extended.
Figure 9:
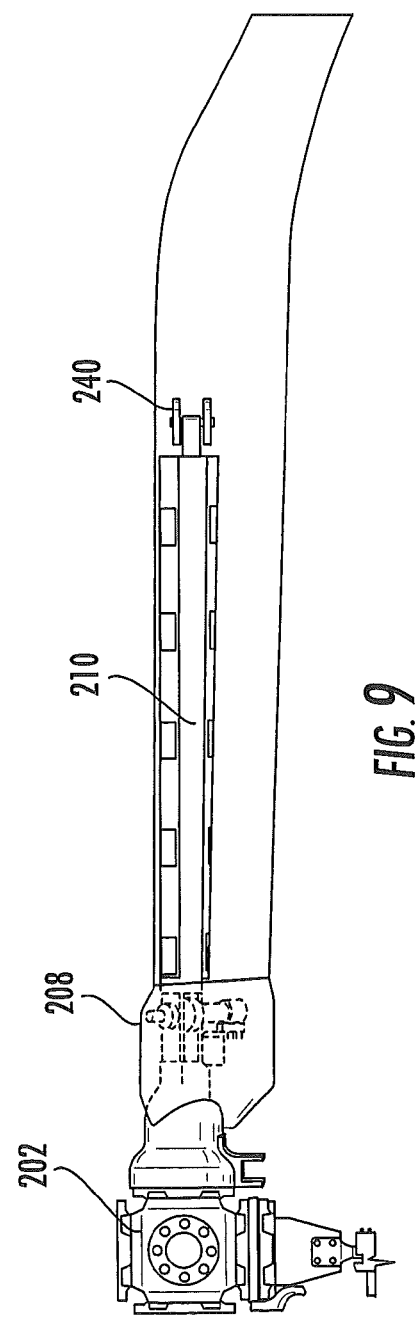
FIG. 9 is a top view showing a rotor blade retracted.

In exemplary embodiments, the strap 210 terminates at the blade inboard end at spool 212, passes through the non-extending torque tube 214 to a wide pulley 240 in the blade and then back inboard to the outboard tip of the torque tube 214. FIGS. 8 and 9 depict an extended and retracted rotor blade, respectively. Shown in FIGS. 8 and 9 are the strap 210 and pulley 240. In this manner, the strap 210 and motors 216 only have to sustain half of the blade centrifugal force.

Stops are used to fix the outboard location of the outboard section of the rotor blade. An outboard stop serves to physically limit travel of the outboard section of the rotor blade in when extended as shown in FIG. 8. Inboard locks 250 (FIG. 7) are used to secure the outboard section of the rotor blade when retracted. By using physical stops and locks, strap 210 is only under load during the transition of the outboard section of the rotor blade. Further, motors 216 are only used during the transition of the outboard section of the rotor blade. Centrifugal force holds the outboard section of the rotor blade on the outboard stops when extended. Locks 250 hold the outboard section of the rotor blade when retracted. The brake assembly on each motor 216 is used to ground a motor that has lost its power supply during transit and the brake is used to hold the spool 212 when the hydraulic supply is shut off.

Mounting the drive mechanisms 206 in the feathering system, has additional maintenance benefits. Unlike some previous configurations, the entire drive/blade/tube assembly can be removed as a single unit by removing the fasteners in a spindle and disconnecting the hydraulic hoses and data lines. Making the telescoping blade assembly a line replaceable unit allows for straightforward blade replacement. A damaged or malfunctioning unit can be sent back to depot to get repaired and refurbished without having to disassemble the strap, spools, motors, bearings, blade, and tube on the aircraft.

Figure 5:
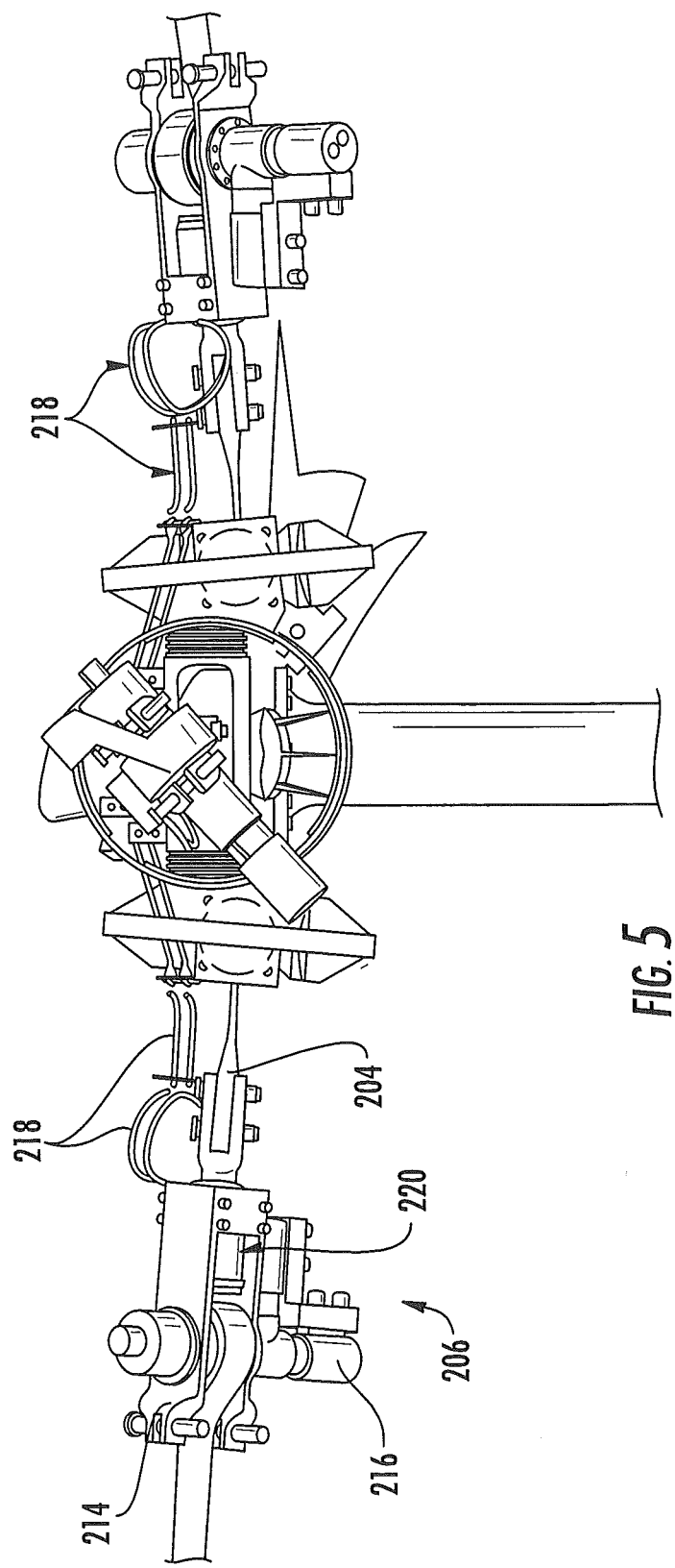
FIG. 5 is a side view of the hingeless rotor hub assembly of FIG. 4.

FIG. 5 is a side view of the hingeless rotor hub assembly of FIG. 4. Shown in FIG. 5 are flexible hydraulic hoses 218 coupled to the drive mechanism 206. Centrifugal force bearings 220 are positioned in the spindles 214.

Figure 6:
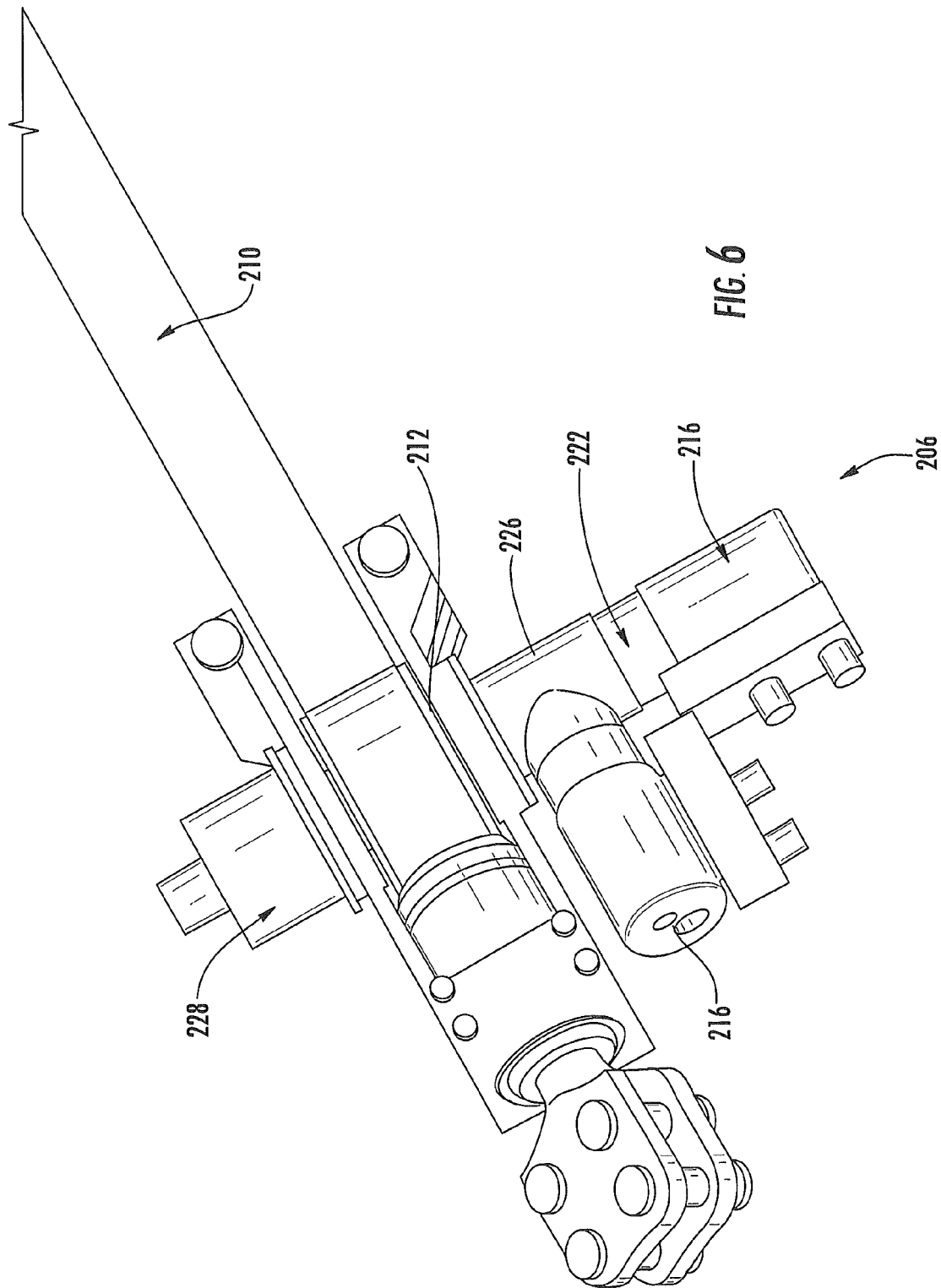
FIG. 6 is a perspective view showing a drive mechanism in the hingeless rotor hub assembly of FIG. 4.

FIG. 6 is a perspective view of a drive mechanism 206 in the hingeless rotor hub assembly of FIG. 4. The drive mechanism 206 includes two over-center variable displacement, hydraulic motors 216. The motors 216 are oriented perpendicular to one another, so they will fit within the strap system fairing 208. Motors 216 are hydraulic, but may be electric. The EHSV on each motor is used to control the speed of spool 212 hydraulically when extending the rotor blades. If electric motors are used, a controller would be used to control the electric motor speed. The EHSV on each motor 216 is again activated when in braking mode (i.e., rotor blade extension) to allow the motor 216 to act as a pump and return fluid to a source. A hydraulic power supply shutoff solenoid and brake assembly 222 on each motor output shaft is used to fix the position of the motor 216 once the desired blade position is reached.

Differential gearing 226 combines the output force from the motors 216 and transfers that force to a cross shaft. A rotary actuator 228 is coupled to the cross shaft and includes a compound, planetary gear set that reduces the high speed motor output into a low speed rotary actuator output. A resolver (e.g., a quad rotary variable differential transformer) determines position of the cross shaft and thus the position of spool 212. The speed of each motor 216 is controlled by its own Electro Hydraulic Servo Valve (EHSV). The EHSV receives feedback from the resolver and varies motor speed to keep the four blades extending or retracting in synchronization.

Figure 7:
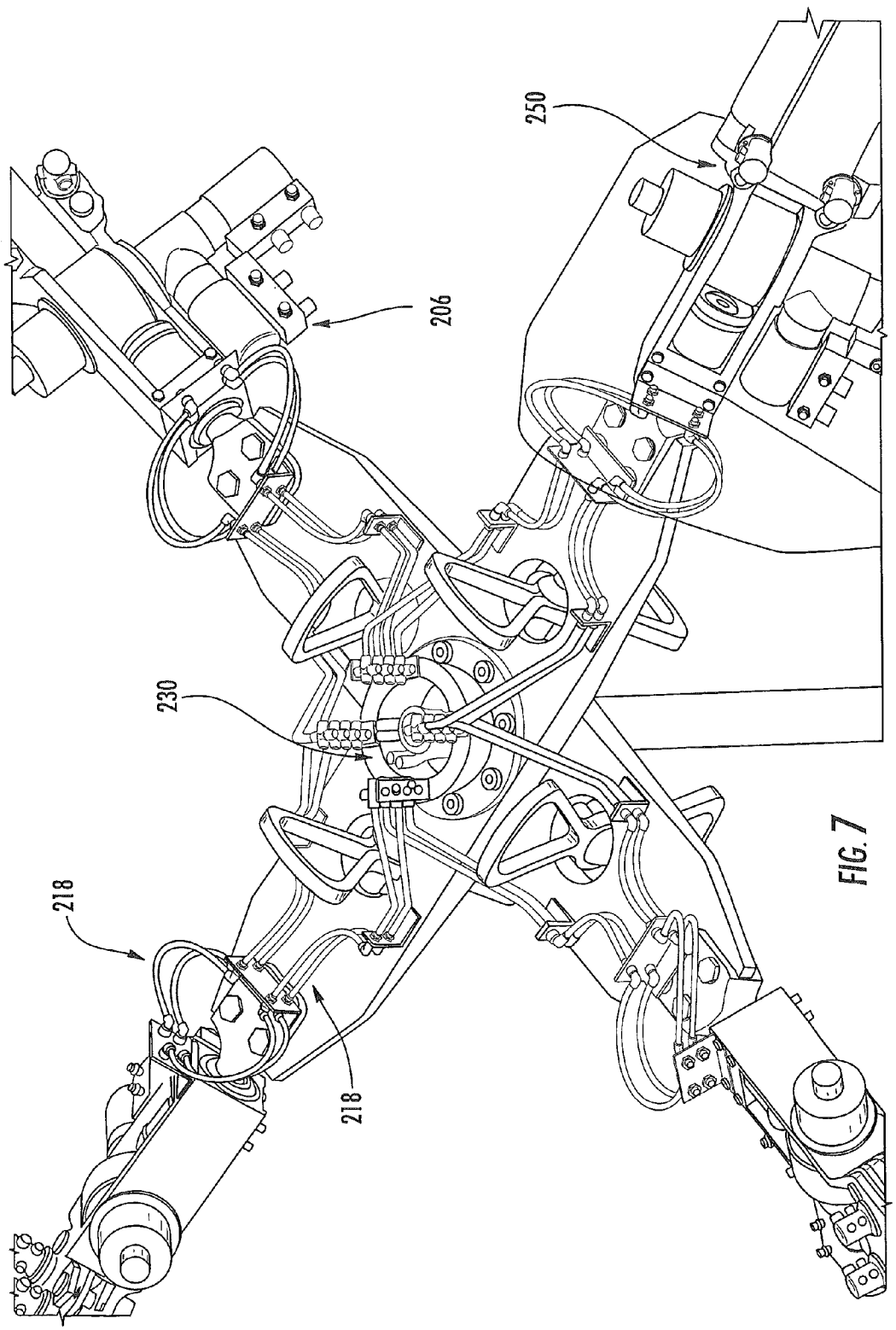
FIG. 7 is a perspective view of the hingeless rotor hub assembly of FIG. 4.

FIG. 7 is a perspective view of the hingeless rotor hub assembly of FIG. 4. Located in the mast in FIG. 7 is a coupling assembly 230 that transfers hydraulic power and electrical power from a source in the stationary airframe to the rotating rotor system. Hydraulic lines are used to connect the coupling assembly to a manifold that distributes fluid to each drive mechanism 206. The hydraulic power supply may include dual pressure sources, providing two pressure hoses and two return hoses to each drive mechanism. FIG. 7 shows the hydraulic return and pressure lines 218. Swivel fittings and flexible hoses are used to allow for blade flapping and pitching motion without hose rupture. The hydraulic power source could also be mounted on the rotor head and be electrically powered through a larger coupling assembly from a source on the airframe.

In operation, when blade retraction is desired, hydraulic power is provided to motors 216 to turn spools 212 and reel in straps 210. This draws the outboard sections of the rotor blades towards the rotor hub 202. A controller monitors the resolvers associated with each drive mechanism 206 and provides feedback to EHSV to maintain synchronized retraction of the blades. When rotor blade extension is desired, the controller activates the shutoff and brake solenoid on each motor 216 causing the motors to operate as pumps driven by the centrifugal force of the blade. The blade extension rate is governed by the controller monitoring the resolvers and adjusting the fluid flow through the pump with the EHSV.

A blade retract lock 250 is employed to offload the strap during airplane mode. Fittings are installed on the inboard end of the blade spar, and a spring loaded locking device 250 is attached to the torque tube. The use of retract locks 250 to hold the outboard section of the rotor blade offloads the strap and increases the life of the strap. The locks 250 can be released by using the drive mechanism to pull the blade inboard just enough to release the latch.

Embodiments place the motor and strap reel in the feathering frame to reduce strap twisting, which improves the life of the strap. Additionally, real time data from the rotary resolver is used to synchronize the blades. By tracking the number of resolver revolutions during the extend/retract cycles, a controller monitors how the strap elongates over time as they wear. This is possible because there are hard defined hard stops at the fully retracted and fully extended position.

Besides monitoring the elongation of the straps, by comparing that elongation data to ground test data on the straps, it can be determined when the straps should be retired and replaced with fresh ones. Similarly, if there is a large change in the number of revolutions required to extend/retract the blade it can be deduced that the strap has been damaged in some way and requires immediate attention. An elongated strap will have reduced thickness requiring more spool revolutions will be required to make the full stroke. This rotary resolver information is fed into the aircraft's health and usage monitoring system (HUMS) and permits the system to have data about the aircraft, not need recurring inspections, and can optimize the strap life all to minimize the maintenance requirements of the VDR system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A rotor hub assembly comprising:
a rotor hub for supporting a telescoping rotor blade having an outboard section; and
a drive mechanism associated with the telescoping rotor blade, the drive mechanism including:
a motor;
a spool driven by the motor; and
a strap wound on the spool, the strap coupled to the outboard section of the telescoping rotor blade;
wherein the motor is operated as a pump when the outboard section of the telescoping rotor blade is extended away from the rotor hub.

2. The rotor hub assembly of claim 1 wherein:
the strap is looped over a pulley in the outboard section of the telescoping rotor blade, a strap end terminating at a torque tube supporting the telescoping rotor blade.

3. The rotor hub assembly of claim 1 further comprising:
a torque tube for mounting the telescoping rotor blade, the strap extending through the torque tube.

4. The rotor hub assembly of claim 1 further comprising:
a resolver counting a number of revolutions of the drive mechanism.

5. The rotor hub assembly of claim 1 further comprising:
a brake assembly coupled to the motor, the brake assembly to fix a position of the motor.

6. The rotor hub assembly of claim 1 further comprising:
a shut off solenoid to fix a position of the motor.

7. The rotor hub assembly of claim 1 further comprising:
a coupling assembly in the rotor hub for transferring power from a source in an airframe to the motor.

8. A rotor hub assembly comprising:
a rotor hub for supporting a telescoping rotor blade having an outboard section; and
a drive mechanism associated with the telescoping rotor blade, the drive mechanism including:
a motor;
a spool driven by the motor; and
a strap wound on the spool, the strap coupled to the outboard section of the telescoping rotor blade;
wherein the motor includes two motors, the two motors geared to drive the spool.

9. A rotor hub assembly comprising:
a rotor hub for supporting a telescoping rotor blade having an outboard section; and
a drive mechanism associated with the telescoping rotor blade, the drive mechanism including:
a motor;
a spool driven by the motor; and
a strap wound on the spool, the strap coupled to the outboard section of the telescoping rotor blade;
a coupling assembly in the rotor hub for transferring power from a source in an airframe to the motor;
a swivel fitting transmitting the power from the coupling assembly to the motor.

10. The rotor hub assembly of claim 9 wherein the drive mechanism further comprises:
a resolver counting a number of revolutions of the drive mechanism.

11. The rotor hub assembly of claim 9 wherein the drive mechanism further comprises:
a brake assembly to fix a position of the motor.

12. The rotor hub assembly of claim 9 wherein the drive mechanism further comprises:
a shut off solenoid to fix a position of the motor.

* * * * *